United States Patent
Ibrahim et al.

(10) Patent No.: US 9,245,443 B2
(45) Date of Patent: Jan. 26, 2016

(54) PASSENGER SERVICES SYSTEM FOR AN AIRCRAFT

(71) Applicant: The Boeing Company, Chicago, IL (US)

(72) Inventors: Yakentim Ibrahim, Brier, WA (US);
Stephen L. Scown, Stanwood, WA (US);
Mark Gus Mehlhaff, Seattle, WA (US);
Casey C. Regan, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 284 days.

(21) Appl. No.: 13/773,506

(22) Filed: Feb. 21, 2013

(65) Prior Publication Data
US 2014/0233959 A1    Aug. 21, 2014

(51) Int. Cl.
*H04B 10/00* (2013.01)
*G08C 23/04* (2006.01)
*H04B 10/11* (2013.01)
*H04B 10/03* (2013.01)

(52) U.S. Cl.
CPC ............ *G08C 23/04* (2013.01); *G08C 2201/63* (2013.01); *G08C 2201/71* (2013.01); *H04B 10/03* (2013.01); *H04B 10/11* (2013.01)

(58) Field of Classification Search
CPC ............... G08C 23/04; G08C 2201/71; G08C 2201/63; H04B 10/03; H04B 10/11
USPC .......................... 398/106–114, 118–131, 1–8
See application file for complete search history.

(56) References Cited

U.S. PATENT DOCUMENTS

| | | | |
|---|---|---|---|
| 4,412,355 A | 10/1983 | Terbrack et al. | |
| 4,471,353 A * | 9/1984 | Cernik | 340/12.22 |
| 4,842,391 A | 6/1989 | Kim et al. | |
| 5,022,733 A | 6/1991 | Angenent et al. | |
| 5,539,564 A * | 7/1996 | Kumozaki | H04B 10/2503 398/136 |
| 5,638,475 A | 6/1997 | Gaebe | |

(Continued)

FOREIGN PATENT DOCUMENTS

| | | |
|---|---|---|
| DE | 3242978 A1 | 5/1984 |
| EP | 0 739 816 A1 | 10/1996 |
| GB | 2430118 A | 3/2007 |

OTHER PUBLICATIONS

Wang et al, A Novel Centrally Controlled Protection Scheme for Traffic Restoration in WDM Passive Optical Networks, Mar. 2005, IEEE Phot. Tech. Letters vol. 17 No. 3, pp. 717-719.*

(Continued)

*Primary Examiner* — Ken Vanderpuye
*Assistant Examiner* — Dibson Sanchez
(74) *Attorney, Agent, or Firm* — Toler Law Group, PC

(57) ABSTRACT

A passenger services system of an aircraft includes a cabin services system of a passenger service unit in the aircraft. The passenger service unit is associated with a passenger seat of the aircraft. The passenger services system further includes an infrared transmitting unit associated with the passenger seat. The infrared transmitting unit is configured to send signals to control operation of the cabin services system. The passenger services system includes a control unit including an infrared receiver. The control unit is associated with the passenger service unit. The infrared receiver is configured to receive the signals from the infrared transmitting unit. The control unit is configured to control the operation of the cabin services system in response to receiving the signals.

20 Claims, 8 Drawing Sheets

(56) References Cited

U.S. PATENT DOCUMENTS

| | | | |
|---|---|---|---|
| 5,684,901 A | 11/1997 | Gaebe | |
| 5,768,458 A | 6/1998 | Ro et al. | |
| 5,808,760 A | 9/1998 | Gfeller | |
| 5,811,791 A * | 9/1998 | Portman | 250/221 |
| 5,926,301 A | 7/1999 | Hirt | |
| 6,278,537 B1 * | 8/2001 | Miyamori | 398/119 |
| 6,288,806 B1 * | 9/2001 | Touma | H04B 10/038 398/2 |
| 6,323,474 B1 | 11/2001 | Bacarella | |
| 6,584,250 B2 | 6/2003 | Lin et al. | |
| 6,614,126 B1 | 9/2003 | Mitchell | |
| 6,829,439 B1 | 12/2004 | Sidorovich et al. | |
| 7,103,324 B2 * | 9/2006 | Sanford et al. | 455/98 |
| 7,137,594 B2 * | 11/2006 | Mitchell et al. | 244/118.6 |
| 7,298,942 B2 | 11/2007 | Blasingame et al. | |
| 7,319,854 B2 * | 1/2008 | vonDoenhoff et al. | 455/345 |
| 7,455,463 B2 | 11/2008 | Togami et al. | |
| 7,597,486 B2 | 10/2009 | Teo et al. | |
| 7,742,704 B2 | 6/2010 | Suzuki et al. | |
| 7,744,293 B2 | 6/2010 | Huang et al. | |
| 7,762,729 B2 | 7/2010 | Teo et al. | |
| 8,166,506 B2 | 4/2012 | Callahan et al. | |
| 8,325,023 B2 * | 12/2012 | Kohlmeier-Beckmann et al. | 340/286.06 |
| 8,666,254 B2 | 3/2014 | Chan et al. | |
| 8,930,088 B2 * | 1/2015 | Bauer et al. | 701/49 |
| 2001/0007505 A1 | 7/2001 | Lee et al. | |
| 2002/0181063 A1 * | 12/2002 | Kropp | H04B 10/506 398/182 |
| 2003/0025969 A1 | 2/2003 | Jacoby, Jr. et al. | |
| 2003/0035182 A1 | 2/2003 | Sidorovich et al. | |
| 2003/0114178 A1 * | 6/2003 | Chapelle et al. | 455/517 |
| 2003/0217363 A1 * | 11/2003 | Brady et al. | 725/76 |
| 2004/0098745 A1 * | 5/2004 | Marston et al. | 725/73 |
| 2004/0114925 A1 * | 6/2004 | Berthold | H04B 10/2503 398/45 |
| 2004/0252998 A1 * | 12/2004 | Schalk et al. | 398/135 |
| 2005/0047731 A1 | 3/2005 | Hu et al. | |
| 2005/0169635 A1 * | 8/2005 | Tirosh et al. | 398/130 |
| 2006/0002667 A1 | 1/2006 | Aronson | |
| 2006/0056855 A1 | 3/2006 | Nakagawa et al. | |
| 2006/0153507 A1 | 7/2006 | Togami et al. | |
| 2007/0159773 A1 | 7/2007 | Deng et al. | |
| 2007/0217788 A1 * | 9/2007 | Gao | H04J 3/14 398/5 |
| 2007/0229302 A1 | 10/2007 | Penick et al. | |
| 2008/0019700 A1 | 1/2008 | Minota | |
| 2008/0101752 A1 | 5/2008 | Chan et al. | |
| 2008/0121757 A1 | 5/2008 | Pozzi et al. | |
| 2008/0159737 A1 | 7/2008 | Noble et al. | |
| 2008/0219671 A1 * | 9/2008 | Schmitt | 398/130 |
| 2009/0095575 A1 | 4/2009 | Nakamura | |
| 2009/0208221 A1 | 8/2009 | Sasai | |
| 2009/0249408 A1 | 10/2009 | Smallhorn | |
| 2010/0135620 A1 | 6/2010 | Chou | |
| 2010/0135671 A1 | 6/2010 | Park et al. | |
| 2010/0189285 A1 | 7/2010 | Niehoff | |
| 2010/0209118 A1 | 8/2010 | Takene et al. | |
| 2010/0265414 A1 | 10/2010 | Nieuwlands | |
| 2010/0322635 A1 | 12/2010 | Klinghult | |
| 2011/0069958 A1 * | 3/2011 | Haas et al. | 398/77 |
| 2011/0110668 A1 | 5/2011 | Lee et al. | |
| 2012/0275795 A1 | 11/2012 | Chan et al. | |
| 2012/0292986 A1 * | 11/2012 | Riedel et al. | 307/9.1 |

OTHER PUBLICATIONS

"Small Form Factor Transceiver Multisource Agreement," Retrieved from http://www.schelto.com/SFP/SFF/Revised%20FF%20MSAV020July%202000.pdf, Jul. 5, 2000, pp. 1-13.

Alqudah, Y., et al., "MIMO Characterization of Indoor Wireless Optical Link Using a Diffuse-Transmission Configuration," IEEE Transactions on Communications, Sep. 2003, vol. 51, No. 9, IEEE, Piscataway, NJ, pp. 1554-1560.

Extended European Search Report for European Application No. 14151521.3 mailed Mar. 28, 2014, 6 pages.

International Search Report and Written Opinion of the International Searching Authority, International Application No. PCT/US2012/030621, mailed May 31, 2012, 14 pages.

Komine, T., et al., "Fundamental Analysis for Visible-Light Communication System using LED Lights", IEEE Transactions on Consumer Electronics, Feb. 2004, vol. 50, No. 1, IEEE, Piscataway, NJ, pp. 100-107.

Yun, G., et al., "Spot-Diffusing and Fly-Eye Receivers for Indoor Infrared Wireless Communications," 1992 IEEE International Conference on Selected Topics in Wireless Communications, 92TH0462-2, IEEE, Piscataway, NJ, pp. 262-265.

* cited by examiner

PASSENGER SERVICES SYSTEM FOR AN AIRCRAFT

FIELD

The present disclosure is generally related to passenger services systems in an aircraft.

BACKGROUND

Commercial aircraft utilize one or more cabin services systems to provide passengers with services, such as reading lights, attendant call functions, and other functions. Depending on the type of the aircraft (e.g., a narrow-body aircraft or a wide-body aircraft), controls to adjust or to receive the cabin services may be located in overhead control units associated with passenger service units or may be located in passenger control units associated with a passenger seat. Some passengers may encounter difficulty reaching controls located in an overhead control unit.

The cabin services systems may be supported by many electrical and mechanical components and by complex wiring. Communicating signals from a passenger control unit to an overhead control unit to control cabin services systems may involve communication via a seat electronics box, in-flight entertainment equipment, computing equipment, or other devices. Wiring systems to support cabin service systems may be complex, may add substantial weight to the aircraft, and may consume valuable space. Further, implementation of cabin services systems may involve tedious configuration and installation of in-flight entertainment databases and cabin services system databases. Replacement of a passenger seat may require additional configuration and installation to configure the passenger seat to communicate with overhead control units.

SUMMARY

Particular embodiments disclosed herein provide a passenger services system for an aircraft. The passenger services system may enable one or more cabin services systems provided by a passenger service unit (PSU) in an aircraft to be controlled from a passenger seat (as opposed to via overhead mounted controls). The passenger seat may be equipped with one or more infrared transmitting units that support communication of control input (e.g., an input to an interface of a passenger control unit) from the passenger seat to a control unit located above (e.g., an Overhead Electronics Unit of a passenger service unit) the passenger seat to control cabin services (e.g., services provides by a cabin services system or an attendant call system). Use of infrared signaling in the passenger services system reduces complexity and weight associated with wiring used to facilitate communication of control signals between a passenger seat and an Overhead Electronics Unit (OEU) to control cabin services systems. Aircraft manufacturers, service providers, and suppliers may benefit from an aircraft that supports a system that reduces equipment, configuration, installation, and maintenance costs to provide cabin services to passengers.

The passenger services system enables operation of one or more cabin services systems provided by a PSU to be controlled from a region (e.g., a single passenger seat or a plurality of passenger seats) in the aircraft. One or more passenger seats in a particular region may be equipped with one or more infrared transmitting units that are configured to communicate signals (e.g., infrared signals) to a control unit equipped with an infrared receiver. The signals may include information (e.g., an infrared transmitting unit identifier or a PSU identifier) identifying a particular passenger seat or a plurality of passenger seats requesting a cabin service from the PSU. The infrared transmitting units and the control units may be configured to enable a passenger seat equipped with the infrared transmitting unit to communicate with control units associated with the same identifier.

An infrared receiver may receive signals from an infrared transmitting unit within a line-of-sight transmission of the infrared transmitting unit. Additionally, or in the alternative, the infrared receiver may be positioned (e.g., recessed) within a housing. The infrared receiver, the housing, or both, may include an aperture. The housing, the aperture, or both, may reduce or prevent other signals or sources of interference (e.g., sunlight beams) and signals from unassociated infrared transmitting units from being received inadvertently. The configuration of the infrared receiver within the housing improves the ability of the infrared receiver to communicate with those passenger seats equipped with infrared transmitting units located within a line-of-sight of the infrared receiver. Passengers may benefit from a system that is easy to operate and that reduces inconvenience during travel on an aircraft.

In a particular embodiment, a passenger services system of an aircraft includes a cabin services system (e.g., a lighting system or an attendant call system) of a passenger service unit in the aircraft. The passenger service unit is associated with (e.g., located proximate to or connected to) a passenger seat of the aircraft. The passenger services system further includes an infrared transmitting unit associated with the passenger seat. The infrared transmitting unit is configured to send signals to control operation of the cabin services system. The passenger services system includes a control unit including an infrared receiver. The control unit is associated with the passenger service unit. The infrared receiver is configured to receive signals from the infrared transmitting unit. The control unit is configured to control the operation of the cabin services system in response to receiving the signals.

In a particular embodiment, a method includes receiving an input from a passenger control unit that is associated with a passenger seat in an aircraft. The input includes first information associated with selection of a control to operate a cabin services system associated with the passenger seat. The method includes sending, from an infrared transmitting unit associated with the passenger control unit, a signal to an infrared receiver of a control unit associated with a passenger service unit of the aircraft. The signal includes the first information and second information about the passenger seat (e.g., index information that differentiates the origin of the signal within a plurality of seats). The control unit is configured to control operation of the cabin services system as indicated by the first information and the second information, and in response to receipt of the signal.

In another particular embodiment, an aircraft includes an infrared transmitting unit associated with a passenger seat in an aircraft. The infrared transmitting unit is configured to send signals to control operation of a cabin services system associated with a passenger service unit of the aircraft. The passenger service unit is associated with the passenger seat. The aircraft includes a control unit associated with the passenger service unit. The control unit includes an infrared receiver, a processor, and a memory accessible to the processor. The memory including instructions that, when executed by the processor, cause the processor to control the operation of the cabin services system in response to receiving signals from the infrared transmitting unit.

The features, functions, and advantages that have been described can be achieved independently in various embodiments or may be combined in yet other embodiments, further details of which are disclosed with reference to the following description and drawings.

DETAILED DESCRIPTION

Figure 1:
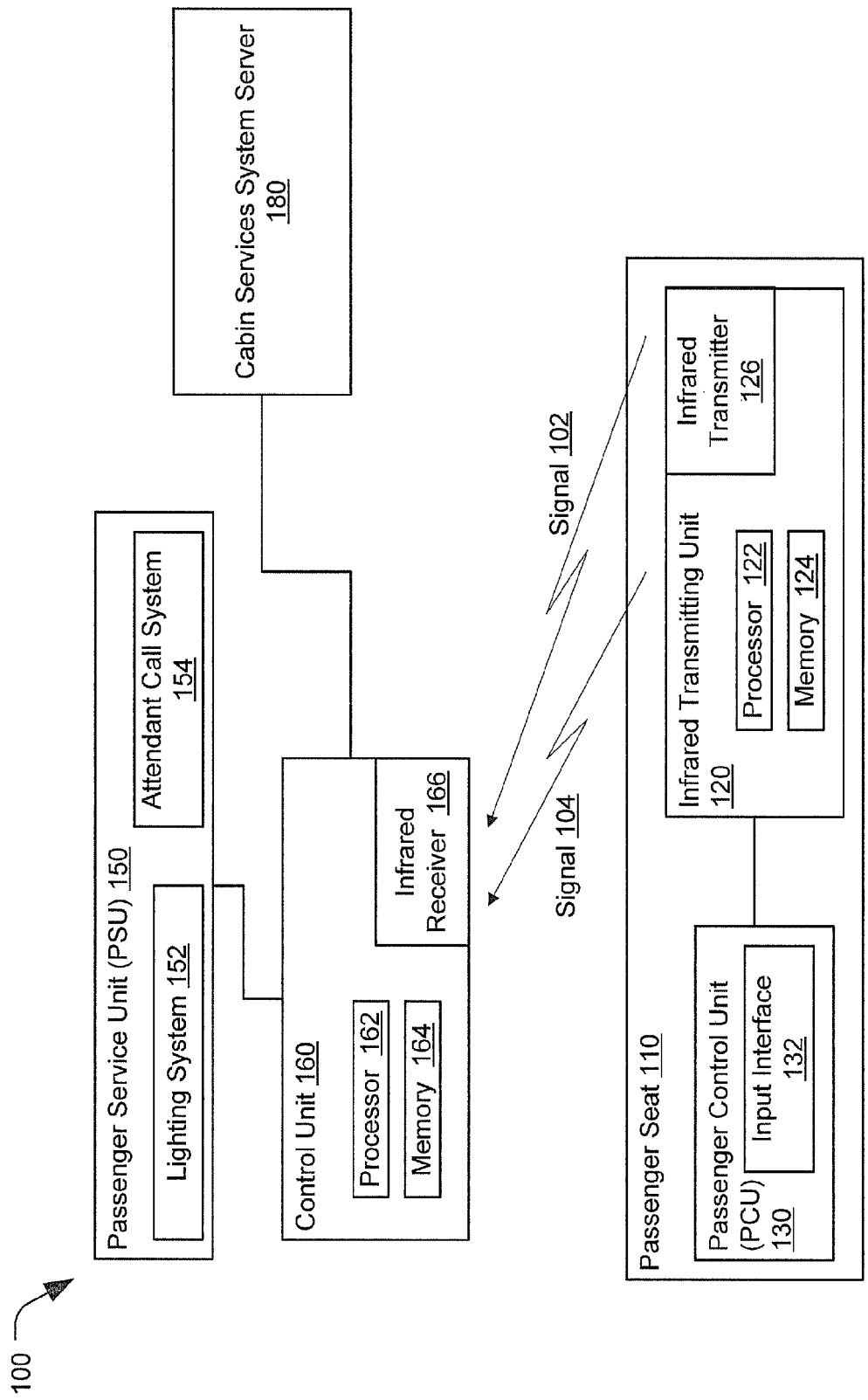
FIG. 1 is a block diagram of a passenger services system.

Referring to FIG. 1, a block diagram of a passenger services system 100 is shown. The passenger services system 100 enables one or more cabin services systems of a passenger services unit (PSU) associated with a passenger seat in an aircraft to be controlled from the passenger seat. A PSU may be associated with one or more passenger seats (e.g., a row of passenger seats) by being situated in an overhead panel above the passenger seats or in a panel beside the passenger seats. Among other things, a PSU may include sub-components, such as one or more cabin service systems (e.g., a lighting system or an attendant call system) that operate reading lights, loudspeakers, illuminated signs, attendant call lights, automatically deployable oxygen masks, air control units, or a combination thereof.

The passenger services system 100 may include a PSU (e.g., PSU 150) that includes one or more cabin services systems, such as a lighting system 152 and an attendant call system 154. The one or more cabin services systems may provide one or more cabin services (e.g., lighting and attendant call functions) to one or more passenger seats, such as a representative passenger seat 110 that is associated with the PSU 150. The lighting system 152 may include one or more reading lights. The attendant call system 154 may include one or more attendant call lights. The attendant call system 154 is configured to send a notification to another system to notify an attendant.

The passenger services system 100 may include one or more control units, such as a representative control unit 160. The control unit 160 may be configured to control one or more cabin services systems associated with the PSU 150. The control unit 160 may be coupled to the PSU 150 or may be located within the PSU 150. The control unit 160 may include a processor 162 and a memory 164 storing instructions that are executable by the processor 162 to perform one or more operations described herein. The control unit 160 may include an infrared receiver, such as a representative infrared (IR) receiver 166.

The passenger services system 100 includes one or more infrared transmitting units, such as a representative infrared transmitting unit (ITU) 120. The infrared transmitting unit 120 may be associated with or included in a passenger seat (such as a representative passenger seat 110) in the aircraft. For example, the infrared transmitting unit 120 may be connected to or included within a portion of the passenger seat 110. In another example, the infrared transmitting unit 120 may be included within (e.g., recessed within a housing of) a passenger control unit (PCU) 130 of the passenger seat 110. The infrared transmitting unit 120 may include one or more infrared transmitters, such as a representative infrared transmitter 126. The infrared transmitter 126 may send one or more signals 102, 104. The one or more signals 102, 104 include infrared signals. The infrared transmitting unit 120 may include a processor 122 and a memory 124 storing instructions that are executable by the processor 122 to perform one or more operations described herein.

The infrared transmitter 126 may be positioned (e.g., recessed) within a housing in the infrared transmitting unit 120. The infrared transmitting unit 120, the housing, or both, may include an aperture. The housing, the aperture, or both, may be configured to direct one or more signals 102, 104 towards a particular infrared receiver (e.g., the infrared receiver 166). For example, when the housing includes the aperture, an area that is within a line-of-sight of the infrared transmitter 126 may be smaller than when the housing does not include the aperture.

The infrared transmitting unit 120 may be configured to cause the infrared transmitter 126 to send signals 102, 104, to control operation of one or more cabin services systems associated with the PSU 150 of the aircraft. The infrared transmitting unit 120 may include or may be coupled to an input interface 132 of the PCU 130 to receive one or more user inputs (e.g., commands, selection of controls, and configuration settings) to control operation of the one or more cabin services systems. The PCU 130 may be located within an armrest or another portion of the passenger seat 110. The input interface 132 may include or be included within a control panel that includes one or more buttons, control knobs, keys, or a combination thereof, that correspond to one or more cabin services. For example, the input interface 132 may include a reading light button to control operation of a reading light of the lighting system 152. In another example, the input interface 132 may include an attendant call button that controls an attendant call light of the attendant call system 154. In a particular embodiment, the infrared transmitting unit 120 is positioned in the PCU 130, in a particular portion of the passenger seat 110, such as a front portion of an armrest of the passenger seat 110 a portion of a headrest of the passenger seat 110, or a combination thereof, to reduce the likelihood of a passenger (e.g., a passenger's finger) blocking the infrared transmitter 126. The signals 102,104 may be sent from multiple infrared transmitting units of the passenger seat 110 using a multiplexing scheme that involves successively, alternating transmission of the signals 102, 104. The signals 102, 104 may be sent based on successive inputs received from the input interface 132. The successive inputs may indicate similar intended functions to control operation of the one or more cabin services. Redundant transmission locations (e.g. the portion of the headrest and the portion of the armrest) may also be employed to reduce the likelihood of the infrared transmitters being blocked simultaneously.

The infrared transmitter 126 may be configured to send signals (e.g., the signal 102 and the signal 104) to one or more infrared receivers that are within a line-of-sight of the infrared transmitter 126. The infrared transmitter 126 may be adjusted to configure the line-of-sight transmissions to one or more infrared receivers. For example, an angle of transmission of the infrared transmitter 126 may be adjusted to send signals to infrared receivers within a particular line-of-sight. By configuring the line-of-sight transmission, the infrared transmitter 126 may be configured to communicate (or to be "paired") with particular infrared receivers. In a particular embodiment, the infrared transmitter 126 is also recessed and/or has an aperture to limit spread of the signals 102, 104 transmitted to the infrared receiver 166.

In a particular embodiment, the signals 102, 104 may be distinguishable by an infrared receiver based on information included in the signals 102, 104. For example, the signals 102, 104 may include one or more identifiers (such as, an infrared transmitting unit code or a PCU code, e.g., in a preamble or data payload of a packet) that may be used to identify a source of the signal 102, 104. The source of the signal 102, 104 may correspond to the infrared transmitter 126, the infrared transmitting unit 120, or the PCU 130 including the infrared transmitting unit 120 that sent the signal 102, 104. An infrared receiver may be configured to receive and process the signals 102, 104 from a particular source (e.g., the infrared transmitting unit 120) based on determination that the signals 102, 104 include an identifier corresponding to the particular source. The infrared receiver may exclude (e.g., not receive or not process) other signals (e.g., signals transmitted by unpaired infrared transmitting units) that are not distinguishable based on or associated with a particular identifier corresponding to a particular infrared transmitting unit (e.g., the infrared transmitting unit 120). By identifying a source of the signals 102, 104 based on the identifier, other signals (e.g., signals transmitted by unpaired infrared transmitting units) that are not configured to communicate with the infrared receiver may not cause interference with operation of the receiver. Rather, the other signals may be excluded because they are not distinguishable based on the identifier.

In alternative embodiments, the signals 102, 104 may be distinguishable by an infrared receiver based on one or more types of transmission schemes. In a particular embodiment, the signals 102, 104 may be distinguishable by an infrared receiver based on a wavelength range of infrared light of the signals 102, 104. An infrared receiver may be configured to receive the signals 102, 104 from the infrared transmitting unit 120 when the signals 102, 104 use infrared light that is within the wavelength range associated with or recognized by the infrared receiver. In this embodiment, an infrared receiver may be paired with or configured to receive the signals 102, 104 from a particular infrared transmitting unit (e.g., the infrared transmitting unit 120) that transmits the signals 102, 104 using infrared light within a particular wavelength range. An infrared receiver may not receive (or may not process) signals that use infrared light that is not within the particular wavelength range.

In another particular embodiment, the signals 102, 104 may be distinguishable by an infrared receiver based on a carrier frequency used to send the signals 102, 104. The infrared transmitting unit 120 may be configured to transmit the signals 102, 104 using a particular carrier frequency that is distinct from another passenger seat (located in another row in the aircraft). An infrared receiver may be configured to receive the signals 102, 104 from the infrared transmitting unit 120 when the signals 102, 104 are send using the particular carrier frequency. Signals 102, 104 that are not transmitted using the particular carrier frequency may be ignored or excluded by the infrared receiver (e.g., not received or not processed).

In a particular embodiment, the one or more identifiers may also be used to identify a single passenger seat (e.g., the passenger seat 110), a group of passenger seats, a zone of an aircraft (e.g., first class, economy class, or business class), or a combination thereof. For example, an identifier, such as a particular PCU code associated with a group of passenger seats in an aircraft (e.g., a row of passenger seats such as Row 1), may be used to identify the group of passenger seats for purposes of providing cabin services to the group. An identifier may include index information that identifies a source (e.g., a passenger seat associated with an infrared transmitting unit) of the signal 102, 104. For example, the index information may identify the passenger seat 110 in a group of passenger seats for which the signal 102, 104 was transmitted to request cabin services. When the signal 102 originates from the infrared transmitting unit 120 that is associated with a passenger seat (e.g., the passenger seat 110) that is located at position "A" in row "1" of the aircraft, the identifier may include index information such as "A1," which identifies the source (the passenger seat 110 located at position "A" in row "1") from which the signal 102 originated. The memory 164 of the control unit 160 may include information associating one or more identifiers (e.g., a transmitting unit identifier or a PCU code) with one or more infrared transmitting units, with a zone of an aircraft, with a passenger seat, or with a group of passenger seats that are provided cabin services by the PSU 150.

The PSU 150 may provide cabin services in response to signals received from a source that is associated with the PSU 150. The signals 102, 104 sent by the infrared transmitter 126 may include cabin service control information that includes information identifying one or more cabin services requested by the infrared transmitting unit 120. The cabin service control information may indicate a requested cabin service, one or more functions associated with a cabin service, other control information (e.g., commands, configurations, and control settings) associated with a cabin service, or a combination thereof.

In a particular embodiment, the control unit 160 may be configured to control operation of the one or more cabin services systems associated with the PSU 150 in response to one or more signals received via the infrared receiver 166. The control unit 160 may be configured to send information to the PSU 150 to control operation of the one or more cabin services systems. The information sent to the PSU 150 may be determined based on one or more signals received by the infrared receiver 166. The information sent to the PSU 150 may include cabin service control information received from an infrared transmitting unit. For example, the cabin service control information may be associated with or based on one or more user inputs received via the input interface 132 of the PCU 130. The cabin service control information may indicate a state (e.g., ON or OFF) associated with a selection of a control (e.g., a reading light button or an attendant call button) of the input interface 132, a configuration setting (e.g., a dimmer setting associated with the reading light button), an identifier indicating a type of the control selected, or a combination thereof.

In a particular embodiment, the control unit 160 may be configured to communicate with a cabin services system server 180 (e.g., a cabin services system headend unit) coupled to the control unit 160. The control unit 160 may communicatively connected to the cabin services system server 180 via one or more computing systems (e.g., zone units) associated with one or more zones (e.g., a section of a cabin or class of the cabin). The one or more computing systems may communicate information from one or more zones to the cabin services system server 180. The information communicated from the one or more zones may include information received from the control unit 160. The information communicated to the cabin services system server 180 may be based on the signals 102, 104 received by the infrared receiver 166. In particular, the information communicated to the cabin services system server 180 may include the cabin service control information of the signals 102, 104. For example, the control unit 160 may communicate with the cabin services system server 180 indicating a request for an attendant based on a selection of an attendant call button indicated by the signal 102, 104. The request may include an identifier received in the signal 102, 104, which identifies the passenger seat 110 associated with the attendant call button. The cabin services system server 180 may control an attendant call notification system that uses the identifier in the request to display a notification of the request associated with the passenger seat 110. The cabin services system server 180 may be configured to control one or more additional cabin services systems based on information communicated to the cabin services system server 180 from the control unit 160. The additional cabin services systems may include an attendant call panel, a display system (e.g., an in-flight entertainment system), lighting systems, notification systems, or a combination thereof.

During operation, a passenger seated in the passenger seat 110 may control a reading light of the lighting system 152. While seated, the passenger may select a control (e.g., a reading light switch) of an input interface (e.g., the input interface 132 of the PCU 130) to operate the lighting system 152. In response to receiving a user input (e.g., selection of a control indicating ON or OFF), the infrared transmitting unit 120 may send the signal 102 to the control unit 160 to control operation of the lighting system 152. The signal 102 may include cabin service control information, such as a requested state of the reading light control (e.g., a state indicating "ON"). The signal 102 may include an identifier, such as a PCU code, indicating that the signal 102 was sent from the PCU 130 associated with the passenger seat 110.

In response to receiving the signal 102 via the infrared receiver 166, the control unit 160 may determine whether the PSU code included in the signal 102 was sent from a source (e.g., the infrared transmitting unit 120) associated with the PSU 150. For example, the control unit 160 may determine whether the PSU code matches one of a plurality of identifiers stored in the memory 164 of the control unit 160. The plurality of identifiers stored in the memory 164 may be associated with infrared transmitting units, PCU's, or both, that are associated with the PSU 150. In response to determining that the signal 102 is sent from the infrared transmitting unit 120, the control unit 160 may control operation of a cabin service system of the PSU 150. For example, the control unit 160 may send a request to the PSU 150 that is based on the cabin service control information included in the signal 102. In response to the request, the PSU 150 may control the reading light to a state (e.g., ON or OFF) corresponding to the passenger's selection. Thus, the passenger may easily control a cabin service, such as lighting, from the passenger seat 110 without having to stand up to operate a control in an overhead control unit.

In another illustrative example, the passenger seated in the passenger seat 110 may call an attendant by controlling the attendant call system 154. While seated, the passenger may select a second control (e.g., an attendant call button) on the input interface 132 to call the attendant. In response to receiving a user input (e.g., selection of the attendant call button), the infrared transmitting unit 120 may send a signal (e.g., the signal 104) to the control unit 160 to control operation of the attendant call system 154. The signal 104 may include information indicating the input (e.g., a state, such as ON or OFF) based on selection of a control (e.g., an attendant call button). The signal 104 may include an identifier, such as a PCU code, indicating that the signal 104 was sent from or associated with the passenger seat 110.

In response to receiving the signal 104 via the infrared receiver 166, the control unit 160 may determine whether the PSU code included in the signal 104 is associated with the PSU 150. For example, the control unit 160 may determine whether the PSU code matches one of a plurality of identifiers stored in the memory 164 of the control unit 160. In response to determining that the signal 104 is sent from the infrared transmitting unit 120, the control unit 160 may control operation of a cabin service system of the PSU 150. For example, the control unit 160 may send a request to the PSU 150 based on the cabin service control information included the signal 104. In response to the request, the PSU 150 may control an attendant call light to the state indicated by the passenger's selection.

In a particular embodiment, the control unit 160 may communicate information (e.g., the cabin service control information and the identifier) received via the signal 104 to the cabin services system server 180. In response to receiving the information, the cabin services system server 180 may control operation of another attendant call system (e.g., a second attendant call system) to provide notification of a request for an attendant based on the information in the signal 104. For example, the notification may indicate a request for an attendant based on the cabin service control information, which indicates input corresponding to the passenger's selection of the attendant call button. The notification may include the identifier, which indicates the PCU code associated with the PCU 130 of the passenger seat 110. The identifier may enable the second attendant call system to provide notification as to a source of the request based on the PCU code.

The passenger services system 100 may enable a passenger to control cabin services while the passenger remains in the passenger seat 110 without the passenger using (e.g., directly interfacing with) an overhead control unit, which may require the passenger to stand up. The communication via the infrared signals 102, 104 between the passenger seat 110 and the control unit 160 associated with the PSU 150 reduces costs of installing and maintaining wiring (e.g., electrical and cable wiring) and equipment (e.g., in-flight entertainment equipment) to enable control of cabin services systems. In addition, the passenger services system 100 may reduce weight of an aircraft and may decrease space otherwise occupied by the wiring and equipment.

In other embodiments, a passenger services system may include a plurality of passenger seats, each including an infrared transmitting unit to communicate with one of a plurality of control units to enable control of one or more cabin services systems associated with a PSU. For example, in FIG. 2, a diagram of a first embodiment of a passenger services system 200 is shown. The passenger services system 200 may include, be included in, or correspond to the single-seat passenger services system 100 of FIG. 1 as shown.

The passenger services system 200 may include a plurality of PSUs. For example, the passenger services system 200 may include the first PSU 150 and a second PSU 250. Each of the plurality of PSUs may be associated with a corresponding passenger seat of a plurality of passenger seats. For example, the first PSU 150 is associated with the first passenger seat 110, and a second passenger seat 210 is associated with the second PSU 250. Each of the plurality of PSUs may include one or more cabin services systems (e.g., a lighting system) that provide one or more cabin services (e.g., lighting, attendant call lighting, and attendant call functions) to the corresponding passenger seat. The first PSU 150 includes the first lighting system 152 including a first reading light 216. The second PSU 250 includes a second lighting system 252 including a second reading light 256.

Each of the plurality of passenger seats 110, 210 may include or may be connected to one or more infrared transmitting units. For example, the one or more infrared transmitting units may be included in a passenger control unit (PCU) 130, 230 associated with a passenger seat. The PCU may be located in an armrest of a passenger seat, a headrest of the passenger seat, another portion of the passenger seat, or a panel next to the passenger seat. The PCU may be self-powered (e.g., using a battery), may be powered using energy harvesting, or both. Additionally, or in the alternative, a seat electronics box of the passenger seat may provide power to the PCU from a power supply within the aircraft connected to the seat electronics box. The infrared transmitting units may be configured to operate as described with respect to the infrared transmitting unit 120 of FIG. 1. For example, the first passenger seat 110 includes the first PCU 130, which includes the first infrared transmitting unit 120. The first infrared transmitting unit 120 may be configured to receive one or more inputs, such as inputs received via the input interface 132 of the PCU 130, to control operation one or more cabin services systems associated with the first PSU 150. The second passenger seat 210 includes a second PCU 230, which includes a second infrared transmitting unit (ITU) 220. The second infrared transmitting unit 220 may be configured to receive one or more inputs from the second PCU 230 to control operation of one or more cabin services systems associated with the second PSU 250.

Each of the plurality of PSUs 150, 250 may be associated with one or more control units. The one or more control units may be configured to control operation of one or more cabin services systems associated with the PSUs 150, 250. For example, the first control unit 160 may be associated with the first PSU 150 and a second control unit 260 may be associated with the second PSU 250.

The first control unit 160 may include the first infrared receiver 166, and the second control unit 260 may include a second infrared (IR) receiver 266. In a particular embodiment, each of the infrared receivers 166, 266 may be configured to receive signals from one or more infrared transmitting units that are within a line-of-sight of the infrared receiver 166, 266.

Figure 2:
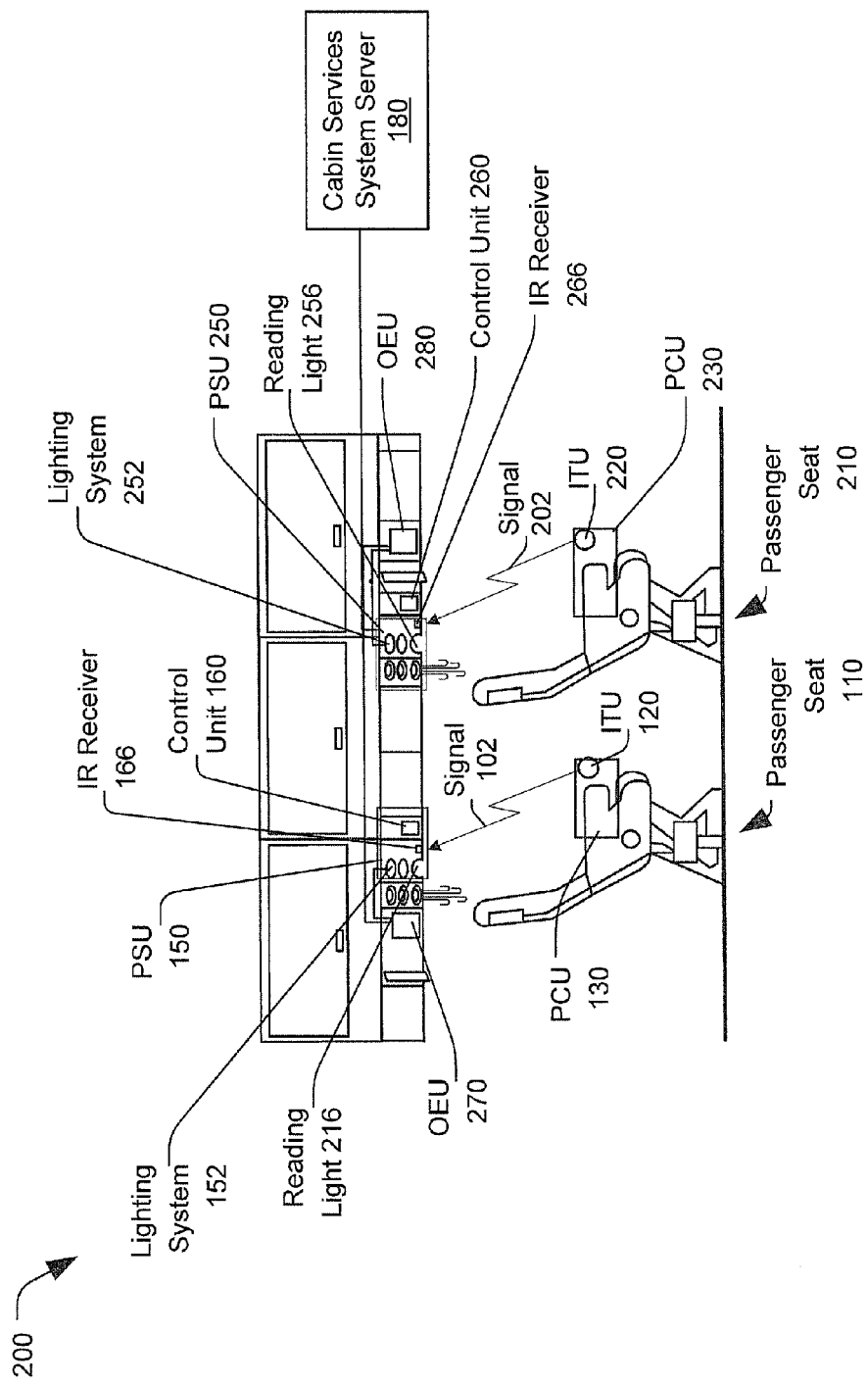
FIG. 2 is a diagram of a first embodiment of a passenger services system.

In a particular embodiment, at least one of the infrared receivers 166, 266 may include, or may be included in a housing in FIG. 2. The line-of-sight of the infrared receivers 166, 266 is related to a position of the infrared receivers 166, 266 within the housing. A size of the housing, a dimension of the housing, other configuration parameters of the housing, or a combination thereof, may also affect the line-of-sight of the infrared receivers 166, 266 based on the position of the infrared receivers 166, 266 within the housing. Positioning the infrared receiver within the housing may reduce interference (e.g., sunlight beams, reading lights) or prevent reception of infrared signals from other infrared transmitting units. Based on the position of the infrared receivers 166, 266 within the housing, the line-of-sight of the infrared receivers 166, 266 may correspond to a particular area or region (e.g., a group of passenger seats or a passenger seat) located below the infrared receiver 166, 266. To illustrate, the first infrared receiver 166 may be positioned within a housing such that infrared transmitting units (e.g., the first infrared transmitting unit 120) located below the first infrared receiver 166 are within a line-of-sight of the first infrared receiver 166, and infrared transmitting units not located below the infrared receiver (e.g., the second infrared transmitting unit 220) are not within the line-of-sight of the first infrared receiver 166.

The PSUs 150, 250 may be communicatively connected to one or more Overhead Electronics Units (OEUs) (e.g., an OEU 270 or an OEU 280). The PSUs 150, 250 may communicate with the OEUs 270, 280 to control operation of one or more cabin services systems. In a particular embodiment, the control units 160, 260 may be communicatively connected to the OEUs 270, 280. The control units 160, 260 may communicate with the PSUs 150, 250 via the OEUs 270, 280 to control operation of one or more cabin services systems associated with the PSUs 150, 250. For example, each of the control units 160, 260 may be configured to send information to one of the OEUs 270, 280 to control operation of one or more cabin services systems of the PSUs 150, 250. The information sent to the OEUs 270, 280 may be determined based on the signals 102, 202. For example, the OEUs 270, 280 may be sent data associated with the identifier in the signals 102, 202, respectively, to indicate a location to be provided one or more cabin services. For example, control units 160, 260 may send index information included in the signals 102, 202 to the OEUs 270, 280, respectively, to provide the location of a passenger seat requesting to receive one or more cabin services. In another example, the information may indicate a selection of a particular control of the PCU 130 and a configuration setting associated with the particular control.

In a particular embodiment, at least one control unit 160, 260 may be configured to communicate with the cabin services system server 180. The cabin services system server 180 may be configured to control one or more additional cabin services systems based on information communicated to the cabin services system server 180. In another particular embodiment, at least one control unit 160, 260 may be configured to communicate with the cabin services system server 180 via one or more of the OEUs 270, 280.

In a particular embodiment, the first PSU 150 provides one or more cabin services to the first passenger seat 110 and does not provide cabin services to the second passenger seat 210. The second PSU 250 provides cabin services to the second passenger seat 210 and does not provide cabin services to the first passenger seat 110. In this embodiment, the first control unit 160 may control operation of one or more cabin services systems of the first PSU 150 based on signals (e.g., the signal 102) received from the first infrared transmitting unit 120 of the first passenger seat 110. The first control unit 160 may exclude (e.g., ignore, reject, or not receive) signals (e.g., the signal 202) communicated from the second infrared transmitting unit 220. In a particular embodiment, the signal 202 is excluded from controlling operations of one or more cabin services systems of the first PSU 150 based on information included within or related to the signal 202. For example, the first control unit 160 may exclude the signal 202 when the signal 202 does not use infrared light that is within a particular wavelength range. In this example, the second infrared transmitting unit 220 may be paired with the second control unit 260 and may be configured to send the signal 202 using infrared light that is within a different wavelength range than the signal 102. In another example, the first control unit 160 may exclude the signal 202 because the signal 202 does not include an identifier (e.g., an infrared transmitting unit code) indicating that the signal was received from an infrared transmitting unit (e.g., the infrared transmitting unit 120) associated with the first PSU 150.

In an illustrative example, the first infrared receiver 166 may receive the signal 202 sent from the second infrared transmitting unit 220 (e.g., because the second infrared transmitting unit 220 is within a line-of-sight of the first infrared receiver 166). The second infrared transmitting unit 220 may be within a line-of-sight of the infrared receiver 166 when the second passenger seat 210 is located within proximity of or adjacent to the first passenger seat 110 (e.g., in front of the first passenger seat 110, behind the first passenger seat 110, or in a row shared with the first passenger seat 110). To determine whether to ignore the signal 202, the first control unit 160 may determine whether an identifier (e.g., a PSU code) included in the signal 202 matches one of a plurality of identifiers stored in a memory of the control unit 160 (e.g., the memory 164 of FIG. 1). The identifier indicates a source of the signal 202 and may be used by the first control unit 160 to determine whether the source (e.g., the second infrared transmitting unit 220) is associated with the first PSU 150. In response to determining that the signal 202 is sent from an infrared transmitting unit that is not associated with the first passenger seat 110, the first control unit 160 may ignore the signal 202 (e.g., prevent the signal 202 from initiating a control operation of a cabin service system of the PSU 150). Thus, the passenger services system 200 may enable a passenger seat to correspond to a control unit associated with a PSU providing cabin services to the passenger seat.

Figure 3:
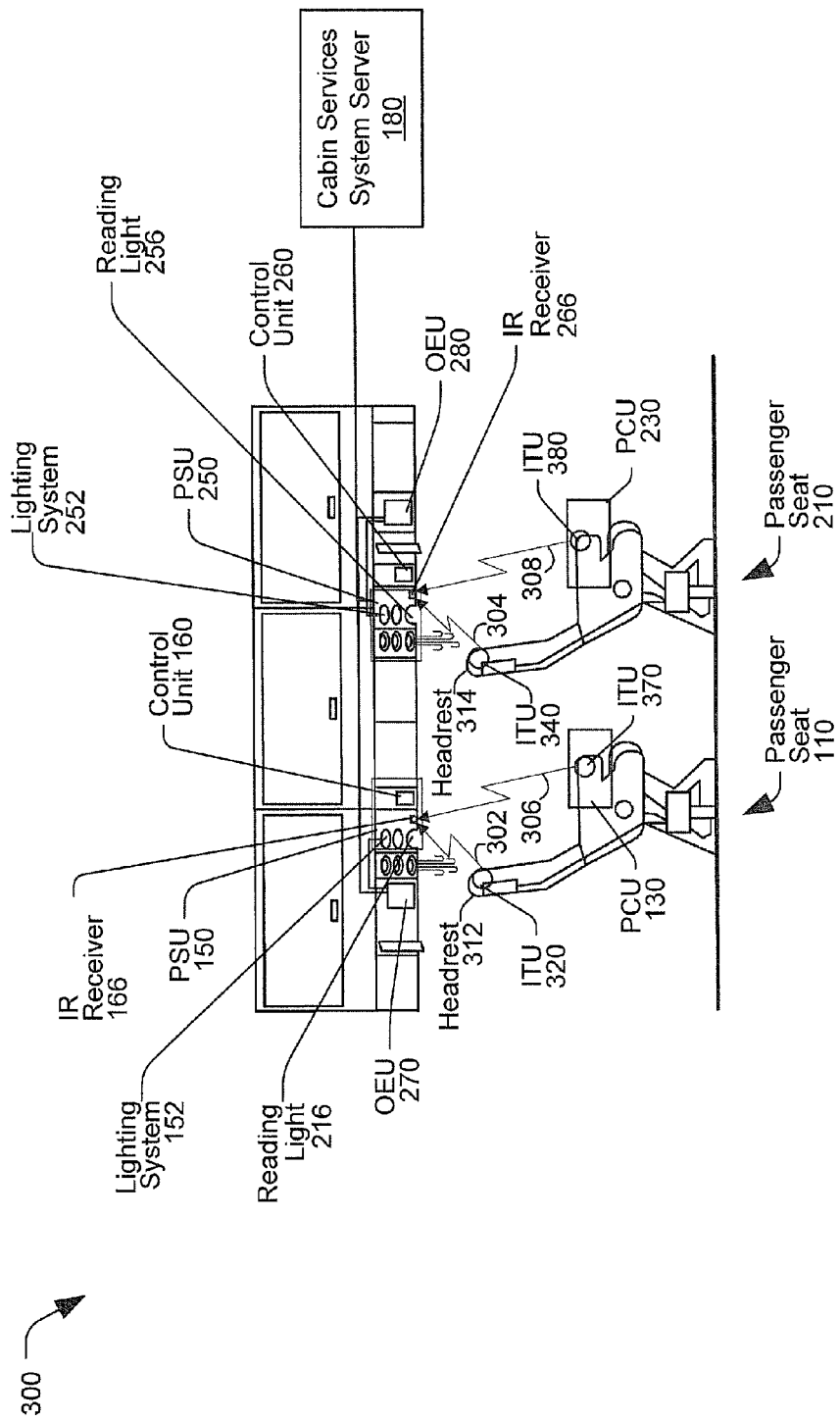
FIG. 3 is a diagram of a second embodiment of a passenger services system.

Referring to FIG. 3, a diagram of a second embodiment of a passenger services system 300 is shown. The passenger services system 300 may include, be included within, or correspond to the passenger services system 200 of FIG. 2 or the passenger services system 100. The passenger services system 300 includes a plurality of passenger seats of an aircraft. Each passenger seat (e.g., the first passenger seat 110 or the second passenger seat 210) includes an infrared transmitting unit that is associated with the passenger seat and that enables control of one or more cabin services systems of a particular PSU associated with the passenger seat. For example, a headrest 312 of the first passenger seat 110 may include a first infrared transmitting unit (ITU) 320. A headrest 314 of the second passenger seat 210 may include a second infrared transmitting unit 340. The infrared transmitting units 320, 340 may operate as described with reference to the first infrared transmitting unit 120 and the second infrared transmitting unit 220 of FIG. 1 and FIG. 2, respectively.

The first infrared transmitting unit 320 may be coupled to the first PCU 130 to receive one or more inputs, via controls of the first PCU 130, to control operation one or more cabin services systems of the first PSU 150. The second infrared transmitting unit 340 may be coupled to the second PCU 230 to receive one or more inputs, via controls of the second PCU 230, to control operation of one or more cabin services systems of the second PSU 250. The first infrared receiver 166 may be configured to receive one or more signals (e.g., a signal 302) from the second infrared transmitting unit 340. The second infrared receiver 266 may be configured to receive one or more signals (e.g., a signal 304) from the second infrared transmitting unit 340. The first infrared receiver 166 may be configured to receive signals from one or more transmitting units within a line-of-sight of the first infrared receiver 166. As described with reference to FIG. 2, the line-of-sight of the first infrared receiver 166 may depend on a position of the first infrared receiver 166 within a housing. For example, the first infrared receiver 166 may be included within a housing such that the first infrared receiver 166 has a line-of-sight that is aligned with the first infrared transmitting unit 320 to receive signals (e.g., the signal 102 and the signal 302). In this example, the housing may be configured such that the first infrared receiver 166 does not have a line-of-sight with the second infrared transmitting unit 220 to receive signals (e.g., the signal 202)

In some embodiments, the passenger seats 110, 210 may include multiple infrared transmitting units. For example, the headrest 312 of the first passenger seat 110 may include the first infrared transmitting unit 320 coupled to the first PCU 130, and an armrest of the first passenger seat 110 may include a third infrared transmitting unit 370 coupled to the first PCU 130. The infrared receiver 166 may be configured to receive a signal 306 from the third infrared transmitting unit 370. The infrared receiver 166 may receive the signal 302 along a first line-of-sight of the infrared transmitting unit 320 and may receive the signal 306 along a second line-of-sight of the infrared transmitting unit 370. The first line-of-sight may be distinct from the second line-of-sight. The headrest 314 of the second passenger seat 210 may include the second infrared transmitting unit 220 coupled to the second PCU 230, and an armrest of the second passenger seat 210 may include a fourth infrared transmitting unit 380 coupled to the second PCU 230. The infrared receiver 266 may be configured to receive a signal 308 from the fourth infrared transmitting unit 380.

In a particular embodiment, multiple infrared transmitting units associated with a passenger seat or a group of passenger seats may each send a signal in response to a user control input. For example, the infrared transmitting units 320, 370 may be configured to simultaneously or concurrently send the signals 302, 306, respectively, in response to receiving input from the PCU 130. In another example, the infrared transmitting units 340, 380 may be configured to simultaneously or concurrently send the signals 304, 308, respectively, in response to receiving input from the PCU 230. Including multiple infrared transmitting units in different locations (e.g., an armrest and a headrest) may provide redundancy in case one of the infrared transmitting units malfunctions, the line-of-sight from one of the infrared transmitting units is blocked, or one or more signals are reflected such that they do not reach an intended infrared receiver.

Figure 4:
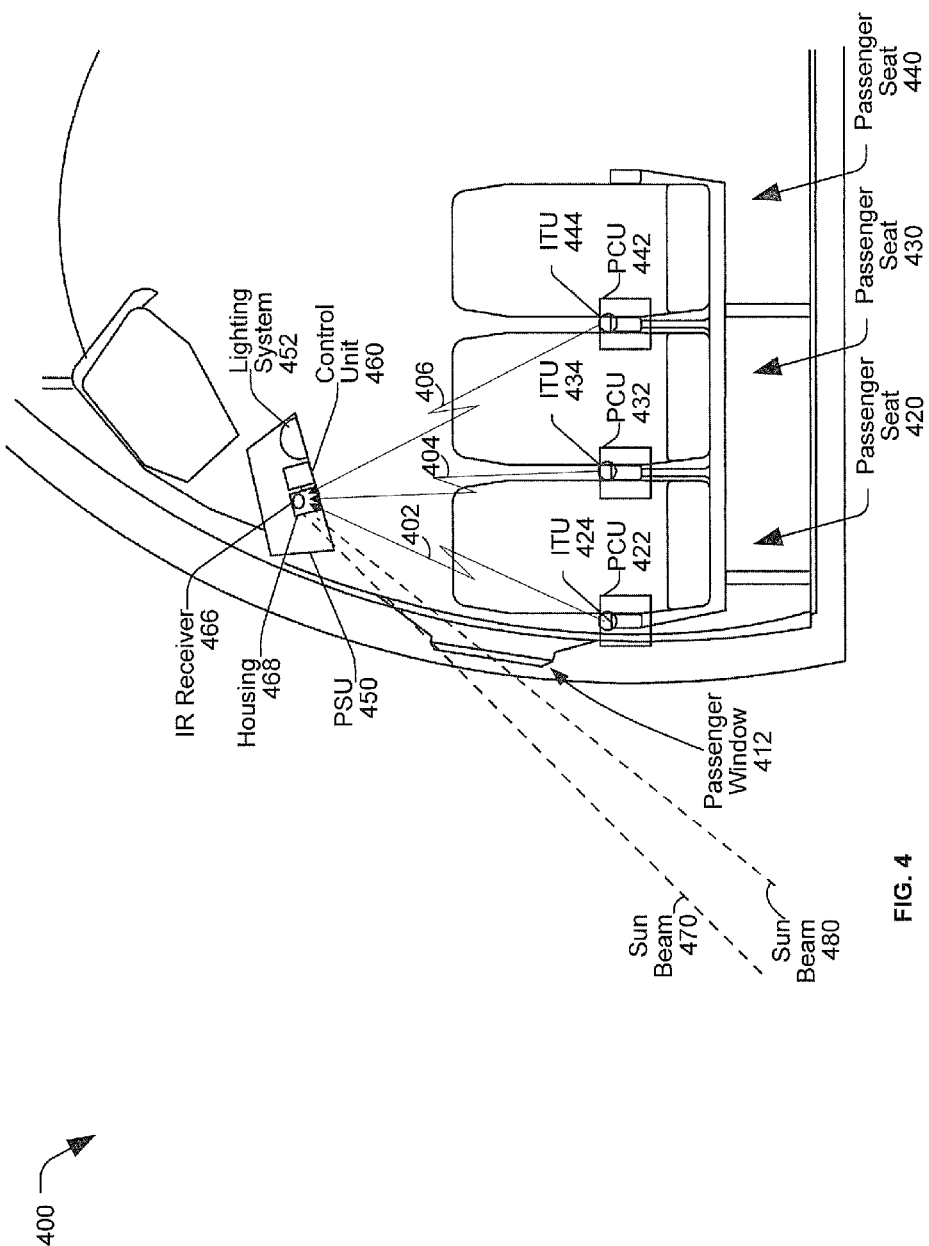
FIG. 4 is a diagram of a third embodiment of a passenger services system.

Enabling communication from a passenger directly to an overhead control unit using inexpensive, infrared transmitting units may reduce costs associated with wires, cables, and equipment to provide cabin services. A passenger seat equipped with infrared transmitting units may be easily configured to communicate with overhead control units without rearranging or replacing wiring throughout various electrical and communication systems in an aircraft Referring to FIG. 4, a diagram of a third embodiment of a passenger services system 400 is shown. The passenger services system 400 includes a plurality of passenger seats, such as a passenger seat 420, a passenger seat 430, and a passenger seat 440. The passenger seats 420, 430, 440 may be located within proximity to or adjacent to each other, such as in a row of passenger seats. The passenger seats 420, 430, 440 may be associated with a particular group within the aircraft, such as a group associated with a particular cabin service, a particular cabin services system, a particular PSU, a particular zone or region (e.g., first class, economy class, or business class) of the aircraft, or a combination thereof.

The plurality of passenger seats 420, 430, 440 may be associated with at least one PSU, such as a representative PSU 450. The PSU 450 may include one or more cabin services systems to provide one or more cabin services to one or more of the plurality of passenger seats 420, 430, 440. For example, the PSU 450 may include a lighting system 452 that provides lighting services to a group of the passenger seats 420, 430, 440.

Each of the plurality of passenger seats 420, 430, 440 may be associated with one or more infrared transmitting units. The one or more infrared transmitting units may be configured to operate as described with respect to the infrared transmitting unit 120 of FIG. 1 or the infrared transmitting unit 220 of FIG. 2. In the passenger services system 400, each of the passenger seats 420, 430, 440 is shown as including an infrared transmitting unit 424, 434, 444, respectively. Each of the infrared transmitting units 424, 434, 444 may be coupled to a PCU (or an input interface) to receive one or more inputs to control operation of one or more cabin services systems. For example, the infrared transmitting units 424, 434, 444 may be coupled to PCUs 422, 432, 442, respectively.

In a particular embodiment, a cabin services system that is shared by a group of the passenger seats 420, 430, 440 may be controlled based on signals received from one or more of the infrared transmitting unit 424, 434, 444 associated with the group of passenger seats 420, 430, 440. For example, the lighting system 152 may be shared by a group of the passenger seats 420, 430, 440. A signal 402, a signal 404, or a signal 406 may be sent by the infrared transmitting unit 424, the infrared transmitting unit 434, and the infrared transmitting unit 444, respectively, to control operation of the lighting system 452. In another particular embodiment, at least two of the infrared transmitting units 424, 434, 444 may be coupled to each other to control operation of a cabin services system (e.g., the lighting system 452) shared by at least two of the coupled infrared transmitting units. In this embodiment, the coupled infrared transmitting units 424, 434, 444 may be configured to substantially simultaneously send signals 402, 404, 406, respectively, in response to one of the coupled infrared transmitting units 424, 434, 444 receiving an input to control operation of the shared cabin services system. For example, the PCUs 422, 432, 442 may be coupled to each other to communicate the signals 402, 404, 406, respectively in response to inputs received by the infrared transmitting unit 424, 434, 444 from one of the PCUs 422, 432, 442.

A control unit 460 may be associated with the PSU 450 to control operation of one or more cabin services systems of the PSU 450. The control unit 460 may function as described with reference to the control unit 160 and the control unit 260 of FIGS. 1 and 2. In a particular embodiment, the control unit 460 may be configured to control operation of a cabin services system (shared by a group of passenger seats 420, 430, 440) via the PSU 450 in response to receiving one or more of the signals 402, 404, 406 from the infrared transmitting units 424, 434, 444, respectively.

The control unit 460 may include an infrared receiver 466. The infrared receiver 466 may be configured to operate as described with respect the infrared receiver 166 of FIG. 1 or an infrared receiver 266 of FIG. 2. The infrared receiver 466 may include, or may be included in a housing 468. The housing 468 may be configured to enable the infrared receiver 466 to receive signals from one or more infrared transmitting units that are within a line-of-sight of the infrared receiver 466. For example, the infrared receiver 466 may be located in a recessed position within the housing 468 to enable the infrared receiver 466 to receive signals from one or more transmitting units (e.g., the infrared transmitting units 424, 434, 444). The recessed position of the infrared receiver within the housing 468 may prevent the infrared receiver 466 from receiving interference or one or more signals from sources other than the infrared transmitting units 424, 434, 444. Additionally, or in the alternative, the signals 402, 404, 406 may include information (e.g., in a preamble or payload of a packet) identifying the infrared transmitting units 424, 434, 444 that send the signal. Examples of signals that may be excluded (or blocked from being received) may include signals sent from one or more other infrared transmitting units that are not associated with one of the passenger seats 420, 430, 440. Examples of interference may include light, such as sunlight received through a passenger window 412 (e.g., one or more sun beams 470, 480). In a particular embodiment, one or more of the infrared transmitting units 424, 434, and 444 may also be recessed within a housing. The housing of the infrared transmitting units 424, 434, and 444 may include an aperture to direct (e.g., focus) the signals 402, 404, 406 toward an intended receiver.

In operation, the first infrared transmitting unit 424 may receive a first input via the PCU 422 to control operation of the lighting system 452. The first input may include information to control operation of the lighting system 452. The second infrared transmitting unit 434 may receive a second input to control operation of the lighting system 452. The third infrared transmitting unit 444 may receive a third input to control operation of the lighting system 452.

In response to receiving the first input, the first infrared transmitting unit 424 may cause a first signal 402 to be sent to the control unit 460 to control operation of the lighting system 452. The first signal 402 may include information that is based on the first input received by the first infrared transmitting unit 424. For example, the information included in the first signal 402 may provide cabin service control information corresponding to a selection of a control (e.g., a reading light control) of the PCU 422. The information included in the first signal 402 may include identifier, such as a position indicator (e.g., position "A" and row "1") of the first passenger seat 420 of the group of passenger seats 420, 430, 440 (e.g., row 1). In response to receiving the second input, the second infrared transmitting unit 434 may cause a second signal 404 to be sent to the control unit 460 to control operation of the lighting system 452. The second signal 404 may include information that is based on the second input received by the second infrared transmitting unit 434. For example, the information included in the second signal 404 may provide cabin service control information corresponding to a selection of a control (e.g., reading light control) of the PCU 432. The information included in the second signal 404 may include identifier, such as a position indicator (e.g., position "B" and row "1") of the second passenger seat 430 of the group of passenger seats 420, 430, 440. In response to receiving the third input, the third infrared transmitting unit 444 may cause a third signal 406 to be sent to the control unit 460 to control operation of the lighting system 452. The third signal 406 may include information that is based on the third input received by the third infrared transmitting unit 444. For example, the information included in the third signal 406 may provide cabin service control information corresponding to a selection of a control (e.g., reading light control) of the PCU 442. The information included in the third signal 406 may include identifier, such as a position indicator (e.g., position "C" and row "1") of the second passenger seat 440 of the group of passenger seats 420, 430, 440. In a particular embodiment, the infrared transmitting units 424, 434, 444 may be coupled together, such that one of the infrared transmitting units 424, 434, 444 may simultaneously or concurrently send the signals 402, 404, 406, respectively, in response to one of the first input, the second input, and the third input being received to control operation of the lighting system 452.

In a particular embodiment, infrared transmitting units of adjacent passenger seats may be used to provide redundant transmission of control signals. For example, in response to receiving the first input, the first infrared transmitting unit 424 may send the signal 402, and the second infrared transmitting unit 434 may send the signal 404. In this example, the signal 402 and the signal 404 may be sent concurrently or simultaneously. The infrared receiver 466 may receive one or more of the signals 402, 404. For example, if the signal 402 is blocked, the infrared receiver 466 may receive the signal 404. The signal 402 and the signal 404 may each include an identifier which may indicate which of the PCU's 422, 432 received the input (e.g., which of the passenger seats 420, 430 is to receive the requested service). Thus, based on an identifier included in each of the signals 402, 404, 406, the control unit 460 may determine that a request indicated by each of the signals 402, 404, 406 corresponds to one of the passenger seats 420, 430, 440 of the group of passenger seats 420, 430, 440 in Row 1. When a cabin service system, such as the lighting system 452 is shared by the group of passenger seats 420, 430, 440, the control unit 460 may control operation of the lighting system 452 for the group based on determining that the identifier indicates Row "1". When a cabin services system is not shared by the group, the control unit 460 may use the position indicator to identify one of the passenger seats 420, 430, 440 to provide with a cabin service indicated by the cabin service control information in the signal 402, 404, 406.

The passenger services system 400 provides an efficient system to enable a group of passenger seats to control operation of shared cabin services from one or more controls associated with the passenger seats in the group. Sending signals from multiple infrared transmitting units associated with a group of passenger seats to control operation of a shared cabin service may increase the likelihood that a request for cabin services from at least one infrared transmitting unit of the group of passenger seats will be received so that the shared cabin service can be provided. The passenger services system blocks interference (e.g., sunlight) and signals sent from other passenger seats outside the group to prevent unintended control of cabin services. Enabling passenger seats in a group to send a signal with a group identifier may reduce costs associated with configuration and installation of passenger seats to the group.

Figure 5:
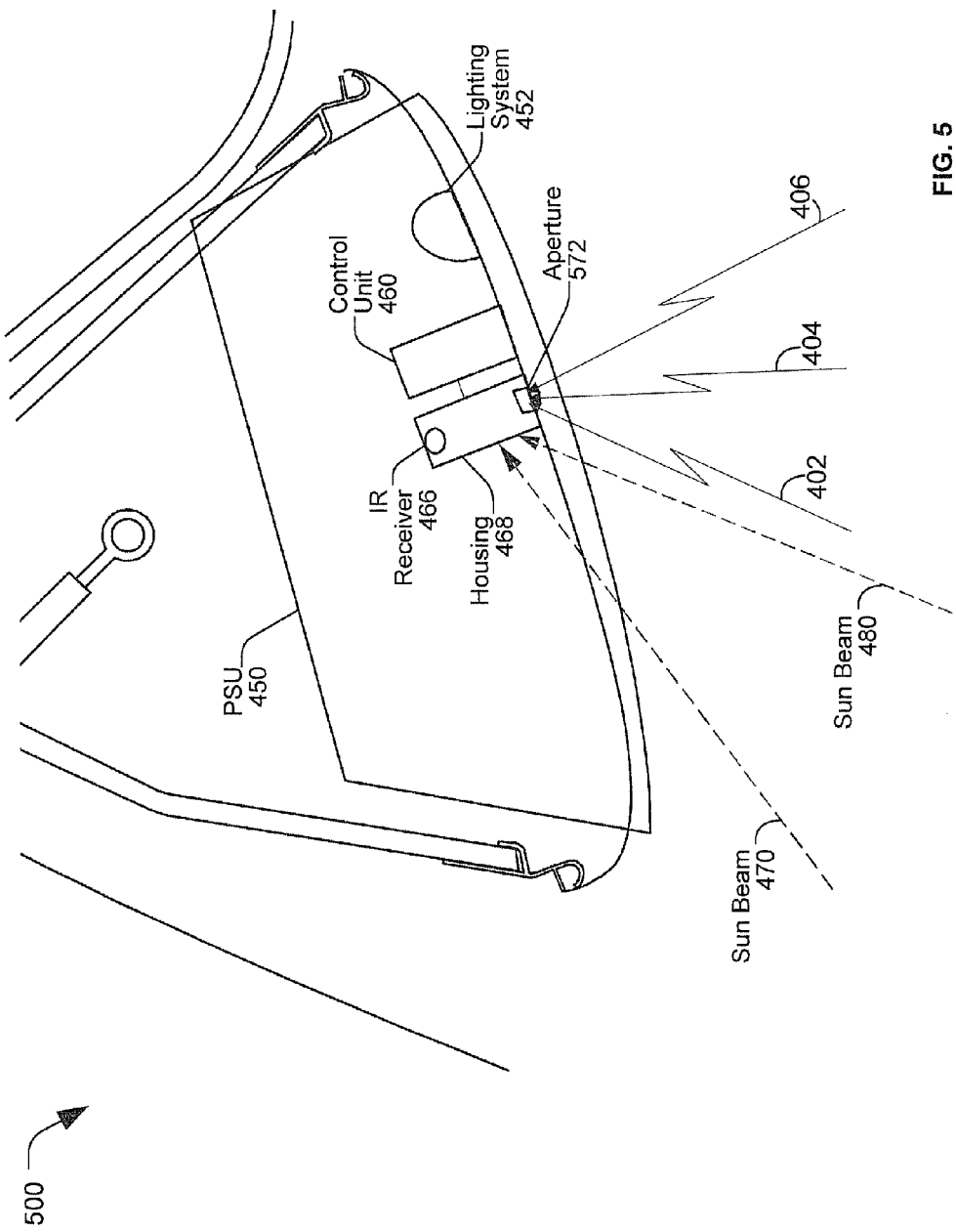
FIG. 5 is a detailed view of a particular embodiment of a passenger services system.

Referring to FIG. 5, a detailed view of a particular embodiment of a passenger services system 500 is shown. The passenger services system 500 may include, be included within, or correspond to the passenger services system 400 of FIG. 4. The passenger services system 500 illustrates the housing 468 including an aperture 572. For example, the aperture 572 may be a slit or other opening, as shown in FIG. 5. The housing 468, the aperture 572, or both, may affect the line-of-sight of the infrared receiver 466. For example, when the housing includes the aperture 572, an area that is within the line of sight of the infrared receiver 466 may be smaller than when the housing 468 does not include the aperture 572. Limiting a line-of-sight of the infrared receiver 466 by positioning the infrared receiver 466 within the housing 468 which includes the aperture 572, may enable the line-of-sight of the infrared receiver 466 to be directed toward particular infrared transmitting units (e.g., the infrared transmitting units 424, 434, 444 provided cabin services by the PSU 450). Thus, by limiting an area corresponding to the line-of-sight of the infrared receiver 466, one or more sources of interference (e.g., the sun beam 470, the sun beam 480, and reading lights not control by the PSU 450) or particular signals (e.g., signals from sources other than the infrared transmitting units 424, 434, 444) may be excluded from being received by the infrared receiver 466.

Figure 6:
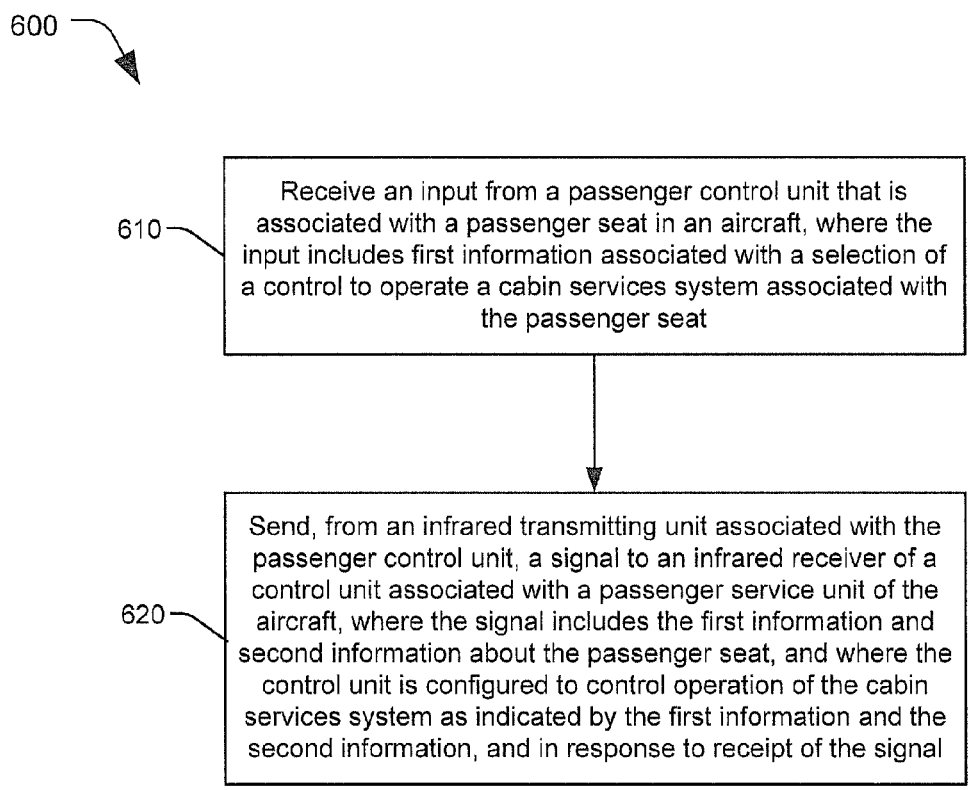
FIG. 6 is a flow diagram of a particular embodiment of a method of performed by a passenger services system.

In FIG. 6, a flow diagram of a particular embodiment of a method 600 performed by a passenger services system is shown. The method 600 may be performed by the passenger services system 100 of FIG. 1, the passenger services system 200 of FIG. 2, the passenger services system 300 of FIG. 3, the passenger services system 400 of FIG. 4, the passenger services system 500 of FIG. 5, or a combination thereof.

At 610, the method 600 includes receiving an input from a passenger control unit that is associated with a passenger seat in an aircraft. The input includes first information associated with a selection of a control to operate a cabin services system associated with the passenger seat. For example, the infrared transmitting unit 120 of FIG. 1 may receive an input from the PCU 130 associated with the passenger seat 110. The input may include first information that is associated with a selection of a control (e.g., a reading light button of the input interface 132 of the PCU 130) to operate the lighting system 152 associated with the passenger seat 110. The first information may include a state (e.g., ON or OFF), a configuration, a setting, or a combination thereof, associated with the selection of the control.

At 620, the method 600 includes sending, from an infrared transmitting unit associated with the passenger control unit, a signal to an infrared receiver of a control unit associated with a passenger service unit of the aircraft. The signal includes the first information that is associated with the selection of the control. The signal includes second information about the passenger seat. The control unit is configured to control operation of the cabin services system as indicated by the first information and the second information, and in response to receipt of the signal. For example, the infrared transmitting unit 120 of FIG. 1 associated with the passenger seat 110 may send the signal 102 to the infrared receiver 166 associated with the PSU 150 of an aircraft. The signal 102 includes the first information that is associated with the selection of the control (e.g., the reading light control of the input interface 132). The signal 102 may also include second information about the passenger seat 110, such as index information indicating a source of the signal 102 associated with the passenger seat 110. The infrared receiver 166 is configured to control the operation of the lighting system 152 as indicated by the first information and second information, and in response to receipt of the signal 102.

Figure 7:
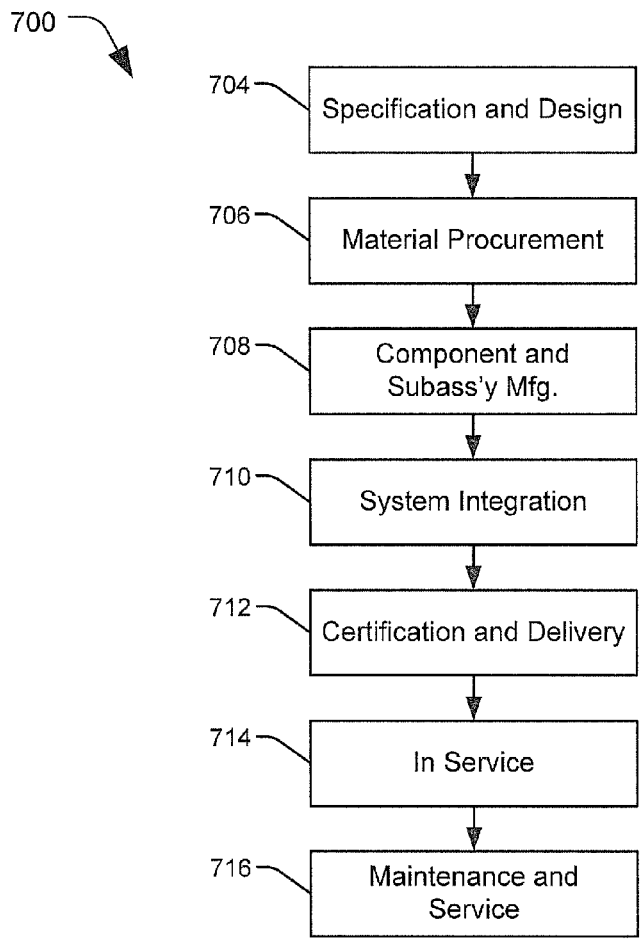
FIG. 7 is a flow diagram of aircraft production and service methodology.
Figure 8:
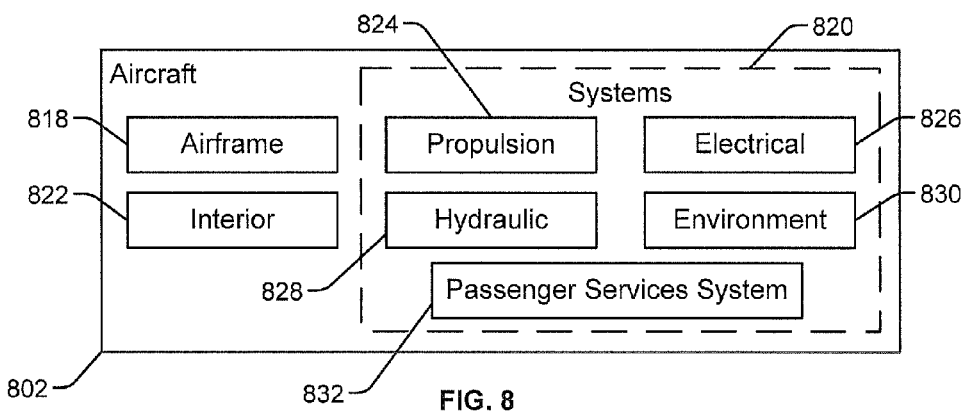
FIG. 8 is a block diagram of an aircraft.

Embodiments of the disclosure may be described in the context of an aircraft manufacturing and service method 700 as shown in FIG. 7 and an aircraft 802 as shown in FIG. 8. During pre-production, exemplary method 700 may include specification and design 704 of the aircraft 802 and material procurement 706. During production, component and subassembly manufacturing 708 and system integration 710 of the aircraft 802 takes place. Thereafter, the aircraft 802 may go through certification and delivery 712 in order to be placed in service 714. While in service by a customer, the aircraft 802 is scheduled for routine maintenance and service 716 (which may also include modification, reconfiguration, refurbishment, and so on).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 802 produced by exemplary method 700 may include an airframe 818 with a plurality of systems 820 and an interior 822. Examples of high-level systems 820 include one or more of a propulsion system 824, an electrical system 826, a hydraulic system 828, an environmental system 830, and a passenger services system 832. The passenger services system 832 may include, be included within, or correspond to the passenger services system 100 of FIG. 1, the passenger services system 200 of FIG. 2, the passenger services system 300 of FIG. 3, the passenger services system 400 of FIG. 4, the passenger services system 500 of FIG. 5, or a combination thereof. Any number of other systems may be included. Although an aerospace example is shown, the principles of the invention may be applied to other industries, such as the automotive industry.

Apparatus and methods embodied herein may be employed during any one or more of the stages of the production and service method 700. For example, components or subassemblies corresponding to production process 708 may be fabricated or manufactured in a manner similar to components or subassemblies produced while the aircraft 802 is in service. Also, one or more apparatus embodiments, method embodiments, or a combination thereof may be utilized during the production stages 708 and 710, for example, by substantially expediting assembly of or reducing the cost of an aircraft 802. Similarly, one or more of apparatus embodiments, method embodiments, or a combination thereof may be utilized while the aircraft 802 is in service, for example and without limitation, to maintenance and service 816.

Figure 9:
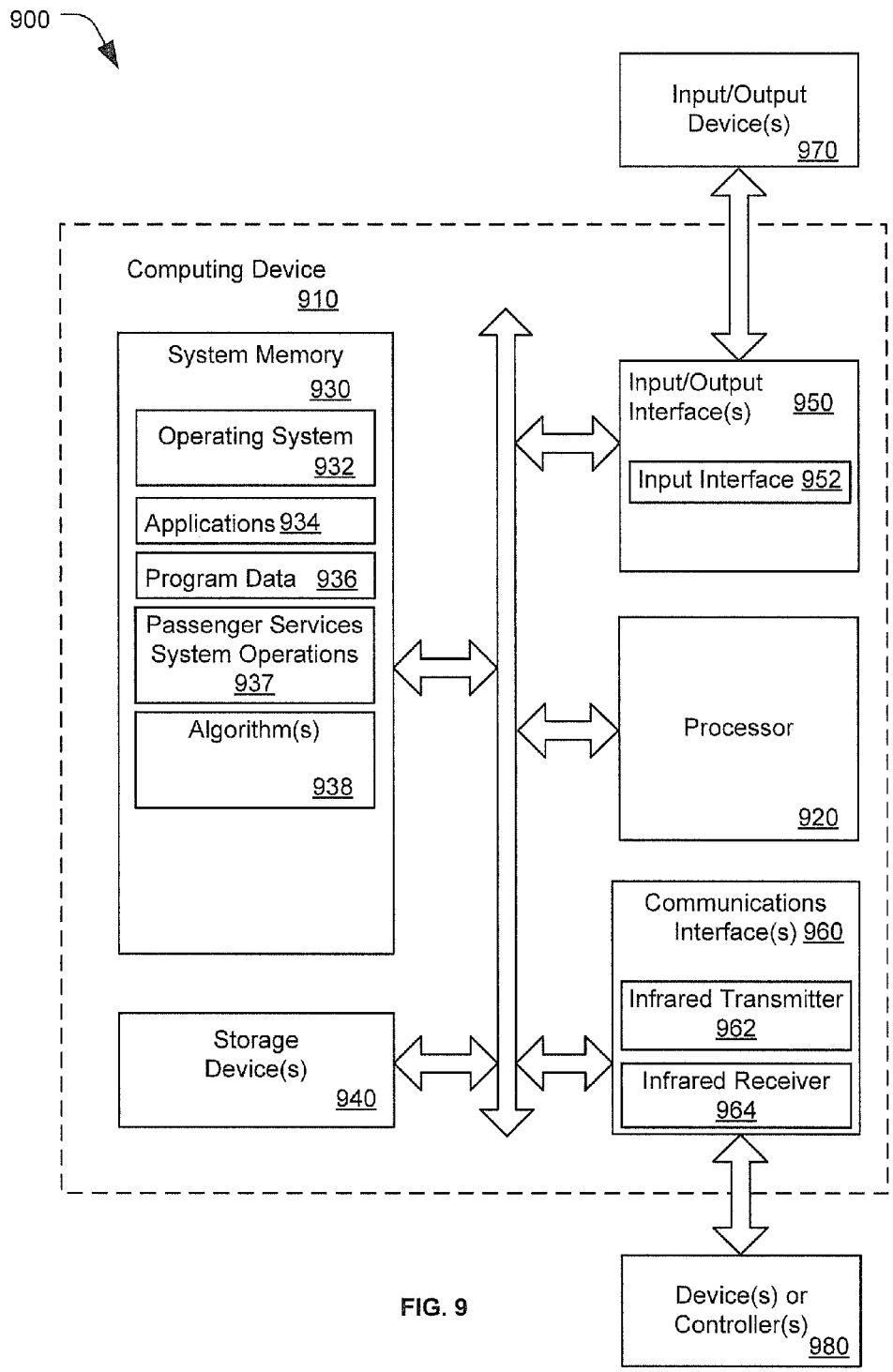
FIG. 9 illustrates a particular embodiment of a computing system that may be used to implement one or more aspects of the disclosure.

FIG. 9 is a block diagram of a computing environment 900 including a general purpose computing device 910 operable to support communications. For example, the computing device 910, or portions thereof, may correspond to the infrared transmitting unit 120 of FIG. 1, the control unit 160 of FIG. 1, the PCU 130 of FIG. 1, the infrared transmitting unit 220 of FIG. 2, the control unit 260 of FIG. 2, the PCU 230 of FIG. 2, the OEUs 270, 280 of FIG. 2, the infrared transmitting units 320, 340, 370, 380 of FIG. 3, the infrared transmitting units 424, 434, 444 of FIGS. 4 and 5, the PCUs 422, 432, 442 of FIG. 4, or the control unit 460 of FIGS. 4 and 5.

The computing device 910 may include at least one processor 920. Within the computing device 910, the at least one processor 920 may communicate with a system memory 930, one or more storage devices 940, one or more input/output interfaces 950, one or more communications interfaces 960, or a combination thereof.

The system memory 930 may include volatile memory devices (e.g., random access memory (RAM) devices), nonvolatile memory devices (e.g., read-only memory (ROM) devices, programmable read-only memory, and flash memory), or both. The system memory 930 may include an operating system 932, which may include a basic input/output system for booting the computing device 910 as well as a full operating system to enable the computing device 910 to interact with users, other programs, and other devices. The system memory 930 may also include one or more applications 934, program data 936, passenger services system operations 937, and algorithm(s) 938. For example, the passenger services system operations 937 may include one or more operations described herein as being performed by the passenger services system 100 of FIG. 1, the passenger services system 200 of FIG. 2, the passenger services system 300 of FIG. 3, the passenger services system 400 of FIG. 4, the passenger services system 500 of FIG. 5, or a combination thereof. The passenger services system operations 937 may include one or more operations performed by the infrared transmitting unit 120 of FIG. 1, the control unit 160 of FIG. 1, the PCU 130 of FIG. 1, the infrared transmitting unit 220 of FIG. 2, the control unit 260 of FIG. 2, the PCU 230 of FIG. 2, the OEUs 270, 280 of FIG. 2, the infrared transmitting units 320, 340, 370, 380 of FIG. 3, the infrared transmitting units 424, 434, 444 of FIGS. 4 and 5, the PCUs 422, 432, 442 of FIG. 4, or the control unit 460 of FIGS. 4 and 5. The algorithms 938 may include the methods described herein, such as the method 600. The algorithms 938 may include a shortest path algorithm, a sub-gradient algorithm, or a combination thereof, that may each be executed by the at least one processor 920. The program data 936 may include data used by the applications 934 to perform respective functions of the applications 934.

The at least one processor 920 may also communicate with one or more storage devices 940. For example, the one or more storage devices 940 may include nonvolatile storage devices, such as magnetic disks, optical disks, or flash memory devices. The storage devices 940 may include both removable and non-removable memory devices. The storage devices 940 may be configured to store an operating system, applications and program data. In a particular embodiment, the system memory 930, the storage devices 940, or both, include tangible, non-transitory computer-readable media. The storage devices 940 may store data used by one or more of the applications 934.

The at least one processor 920 may also communicate with one or more input/output interfaces 950. The input/output interface 950 may include the input interface 952. The input interface 952 may include, be included within, or correspond to the input interface 132 of FIG. 1, or an input interface of the PCU 230 of FIG. 2, or one of the PCUs 422, 432, 442 of FIG. 4. The one or more input/output interfaces 950 may enable the computing device 910 to communicate with one or more input/output devices 970 to facilitate user interaction. For example, the one or more input/output interfaces 950 may be adapted to receive input from the user, to receive input from another computing device, or a combination thereof. The input/output interfaces 950 may conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces. The input/output devices 970 may include user interface devices and displays, including some combination of buttons, keyboards, pointing devices, displays, speakers, microphones, touch screens, and other devices.

The at least one processor 920 may communicate with other computer systems 980 and/or other devices via the one or more communications interfaces 960. The one or more communications interfaces 960 may include wired Ethernet interfaces, IEEE 802 wireless interfaces, Bluetooth communication interfaces, electrical, optical or radio frequency interfaces, infrared interfaces, or other wired or wireless interfaces. The one or more communication interfaces 960 may include an infrared transmitter 962. The infrared transmitter 962 may correspond to the infrared transmitter 126 of FIG. 1. The infrared transmitter 962 may be included within the infrared transmitting unit 120 of FIG. 1, the infrared transmitting unit 220 of FIG. 2, the infrared transmitting units 320, 340, 370, 380 of FIG. 3, or the infrared transmitting units 424, 434, 444 of FIGS. 4 and 5. The one or more communication interfaces 960 may include an infrared receiver 964. The infrared receiver 964 may correspond to the infrared receiver 166 of FIG. 1, the infrared receiver 266 of FIG. 2, or the infrared receiver 466 of FIG. 4. The infrared receiver 964 may be included within the control unit 160 of FIG. 1, the control unit 260 of FIG. 2, or the control unit 460 of FIGS. 4 and 5. The other computer systems 980 may include host computers, servers, workstations, portable computers, telephones, tablet computers, or any other communication device or component.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the illustrations or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments and other embodiments not specifically described herein will be apparent to those of skill in the art upon reviewing the description.

In the foregoing Detailed Description, various features may have been grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A passenger services system of an aircraft comprising:
   a cabin services system of a passenger service unit in an aircraft, wherein the passenger service unit is associated with a plurality of passenger seats of the aircraft;
   a plurality of infrared transmitting units associated with the plurality of passenger seats, wherein the plurality of infrared transmitting units are configured to send one or more signals to control operation of the cabin services system, a first infrared transmitting unit of the plurality of infrared transmitting units is associated with a first passenger seat of the plurality of passenger seats, and a second infrared transmitting unit of the plurality of infrared transmitting units is associated with a second passenger seat of the plurality of passenger seats; and
   a control unit including an infrared receiver, wherein the control unit is associated with the passenger service unit, wherein the infrared receiver is recessed within a first housing, the infrared receiver is configured to receive the one or more signals through a first aperture of the first housing, and the first aperture is configured to exclude a particular signal associated with an interference source from being received by the infrared receiver, and wherein the control unit is configured to:
      receive, at the infrared receiver, a first signal from the first infrared transmitting unit and a second signal from the second infrared transmitting unit;
      determine that the first signal includes an identifier corresponding to the first infrared transmitting unit and that the second signal includes the identifier corresponding to the first infrared transmitting unit;
      determine, based on the identifier, that the first signal and the second signal correspond and to a single request by the first infrared transmitting unit; and
      control operation of the cabin service system based on the single request.

2. The passenger services system of claim 1, wherein the first infrared transmitting unit is recessed within a second housing and is configured to transmit the first signal through a second aperture of the second housing, and wherein the second aperture is configured to direct the first signal toward the infrared receiver.

3. The passenger services system of claim 1, wherein the infrared receiver is further configured to receive the first signal within a first line of sight of the first infrared transmitting unit.

4. The passenger services system of claim 3, wherein:
   the infrared receiver is configured to receive the second signal from the second infrared transmitting unit within a second line of sight of the second infrared transmitting unit; and
   the second line of sight is distinct from the first line of sight.

5. The passenger services system of claim 1, wherein the first signal and the second signal are sent concurrently to the infrared receiver of the control unit.

6. The passenger services system of claim 1, wherein the control unit is further configured to communicate the one or more signals to a cabin services system server to control operation of one or more cabin services systems.

7. The passenger services system of claim 1, wherein the interference source is sunlight.

8. The passenger services system of claim 1, wherein the first infrared transmitting unit is located in a passenger control unit associated with the first passenger seat, and wherein the first infrared transmitting unit is configured to send the first signal in response to an input received from a control of the passenger control unit.

9. The passenger services system of claim 1, wherein the first infrared transmitting unit is located in a headrest of the first passenger seat.

10. The passenger services system of claim 1, wherein the first signal includes a first signal portion indicating a first location corresponding to the first passenger seat, and wherein the second signal include a second signal portion indicating a second location corresponding to the second passenger seat.

11. The passenger services system of claim 10, wherein the control unit is further configured to control operation of the cabin services system in response to receiving the first signal, the second signal, or both.

12. The passenger services system of claim 1, further comprising:
   an attendant call system associated with the passenger service unit, and
   wherein the control unit is configured to control operation of the attendant call system in response to receiving the one or more signals.

13. The passenger services system of claim 1, further comprising:
   a second cabin services system of a second passenger service unit in the aircraft, wherein the second passenger service unit is associated with a third passenger seat of the aircraft;
   a third infrared transmitting unit associated with the third passenger seat, wherein the third infrared transmitting unit is configured to send a third signal to control operation of the second cabin services system; and
   a second control unit including a second infrared receiver, wherein the second control unit is associated with the third passenger seat, wherein the second infrared receiver is configured to receive the third signal from the third infrared transmitting unit, and wherein the second control unit is configured to control operation of the second cabin services system in response to receiving the third signal.

14. The passenger services system of claim 13, wherein the second infrared receiver is in a recessed position within a second housing and wherein the second infrared receiver does not receive the signals based on the recessed position of the second infrared receiver.

15. The passenger services system of claim 1, wherein the first aperture is configured to exclude one or more particular signals from being received by the infrared receiver.

16. The passenger services system of claim 15, wherein the one or more particular signals are sent from one or more third infrared transmitting units that are not associated with the passenger seat.

17. A method comprising:
receiving, from a first infrared transmitting unit associated with a first passenger seat of an aircraft, a first signal at an infrared receiver of a control unit, the control unit associated with a passenger service unit of the aircraft;
receiving, from a second infrared transmitting unit associated with a second passenger seat of the aircraft, a second signal at the infrared receiver, wherein the infrared receiver is recessed within a first housing and is configured to receive at least one of the first signal or the second signal through a first aperture of the first housing, and wherein the first aperture is configured to exclude a particular signal associated with an interference source from being received by the infrared receiver;
determining, at the control unit, that the first signal includes an identifier corresponding to the first infrared transmitting unit and that the second signal includes the identifier corresponding to the first infrared transmitting unit;
determining, based on the identifier, that the first signal and the second signal correspond to a single request by the first infrared transmitting unit; and
controlling, based on the single request, operation of a cabin service system associated with the first passenger seat.

18. The method of claim 17, wherein, in response to receiving at least one of the first signal or the second signal, the control unit sends a request to an overhead electronics unit to control the operation of the cabin services system.

19. An aircraft comprising:
a plurality of infrared transmitting units associated with a plurality of passenger seats and a passenger service unit, wherein:
the plurality of infrared transmitting units are configured to send one or more signals to control operation of a cabin services system,
a first infrared transmitting unit of the plurality of infrared transmitting units is associated with a first passenger seat of the plurality of passenger seats, and
a second infrared transmitting unit of the plurality of infrared transmitting units is associated with a second passenger seat of the plurality of passenger seats; and
a control unit associated with the passenger service unit, the control unit including:
an infrared receiver, wherein the infrared receiver is recessed within a first housing and is configured to receive the one or more signals through a first aperture of the first housing, and wherein the first aperture is configured to exclude a particular signal associated with an interference source from being received by the infrared receiver;
a processor; and
a memory accessible to the processor, the memory including instructions that, when executed by the processor, cause the processor to:
receive, via the infrared receiver, a first signal from the first infrared transmitting unit and a second signal from the second infrared transmitting unit;
determine that the first signal includes an identifier corresponding to the first infrared transmitting unit and that the second signal includes the identifier corresponding to the first infrared transmitting unit;
determine, based on the identifier, that the first signal and the second signal correspond to a single request by the first infrared transmitting unit; and
control operation of the cabin services system based on the single request.

20. The aircraft of claim 19, wherein the first signal and the second signal are received within a line of sight of the infrared transmitting unit.

* * * * *